United States Patent [19]
Mishiba et al.

[11] 4,429,074
[45] Jan. 31, 1984

[54] PAPER COATING COMPOSITION AND ITS PRODUCTION

[75] Inventors: Saburo Mishiba; Kiyonari Ohta; Kazumasa Fujieda, all of Niihama; Kojiro Matsumoto, Takarazuka; Akira Uchida, Nara, all of Japan

[73] Assignee: Sumitomo Naugatuck Co., Ltd., Japan

[21] Appl. No.: 324,906

[22] Filed: Nov. 25, 1981

Related U.S. Application Data

[63] Continuation of Ser. No. 108,078, Nov. 19, 1981, abandoned.

[30] Foreign Application Priority Data

Dec. 28, 1978 [JP] Japan ................. 53-162988

[51] Int. Cl.$^3$ .................. C08F 2/24; C08F 236/06; C08K 3/34
[52] U.S. Cl. .................. 524/819; 428/511; 428/514; 524/426; 524/447; 524/821
[58] Field of Search .............. 524/558, 560, 559, 556, 524/819, 821

[56] References Cited

U.S. PATENT DOCUMENTS

| | | | |
|---|---|---|---|
| 3,886,110 | 5/1975 | Go | 428/537 |
| 3,941,912 | 3/1976 | Tajima | 428/537 |
| 3,970,629 | 7/1976 | Izaki | 428/537 |
| 4,001,163 | 1/1977 | Matner | 428/537 |

FOREIGN PATENT DOCUMENTS 2602444 7/1976 Fed. Rep. of Germany .

Primary Examiner—C. A. Henderson
Attorney, Agent, or Firm—Jones, Tullar & Cooper

[57] ABSTRACT

A coating composition for paper comprising a mineral pigment and a polymer latex prepared by emulsion polymerization of a monomeric mixture comprising an aliphatic conjugated diene monomer, an ethylenically unsaturated carboxylic acid monomer and a monoolefinic monomer in a weight proportion of 24.5–50:0.5–5:45–75 in the presence of a chain transfer agent, characterized in that the chain transfer agent is carbon tetrachloride and an alkylmercaptan in combination.

6 Claims, No Drawings

PAPER COATING COMPOSITION AND ITS PRODUCTION

CROSS REFERENCE TO RELATED APPLICATION

This application is a continuation of application Ser. No. 108,078, filed Nov. 19, 1981 now abandoned.

BACKGROUND OF THE INVENTION

The present invention relates to a paper coating composition and its production. More particularly, it relates to a coating composition (i.e. coating color) for paper comprising a mineral pigment and a certain polymer latex having improved performance.

In recent years, a high-speed printing process has been rapidly developed due to the appearance of web offset printing presses and UV irradiation curing type ink compositions. In association with such developments, various performances have been demanded of coating compositions and coated papers. Namely, coating compositions are required to have high stability to mechanical shearing force as well as significant heat resistance. Further, coated papers are required to have excellent adhesive strength, water resistance and blister resistance without generation of any unfavorable smell on irradiation of ultraviolet rays for drying. These performances of coating compositions and coated papers are much influenced by the properties of polymer latexes used as binders in the coating compositions. Particularly when the polymer latexes contain much coagula, streaks are caused on application with a blade, staining occurs on calender treatment, and blanket piling occurs on printing, etc. Because of these reasons, an attempt has been made to eliminate the coagula from the polymer latexes by filtration. However, the operation is troublesome, and the resulting polymer latexes become more expensive.

On the other hand, it is known that a close relationship is present between the crosslinking structures of the polymer latexes and the performance of the coated papers prepared by application of the coating compositions containing them. Thus, in the production of the polymer latexes, chain transfer agents such as alkylmercaptans, thiuram sulfides, carbon tetrachloride and carbon tetrabromide are introduced into the reaction system for control of the crosslinking structures, i.e. regulation of the molecular weights. However, the use of alkylmercaptans or thiuram sulfides enhances the formation of coagula in the produced polymer latexes and deteriorates the mechanical stability of the coating composition incorporated therewith. Further, an unfavorable smell is generated on irradiation with ultraviolet rays. Carbon tetrachloride or carbon tetrabromide does not have a satisfactory chain transfer effect, and therefore must be used in a relatively large amount. Because of this reason, the extent of dirt in the reactor is greatly increased, and the amount of the residue in the reactor after the polymerization becomes large.

SUMMARY OF THE INVENTION

As the result of an extensive study to overcome the said problem, it has now been found that the combined use of carbon tetrachloride and an alkylmercaptan in the polymerization of a polymer latex shows an excellent chain transfer effect, and the use of the produced polymer latex as a binder in a paper coating composition can improve the adhesive strength of such composition onto a paper, enhance the water resistance and the blister resistance of the paper coated with such composition and decrease the smell on irradiation by ultraviolet rays.

DETAILED DESCRIPTION OF THE INVENTION

The paper coating composition of the present invention comprises as the essential components a mineral pigment and a polymer latex prepared by emulsion polymerization of an aliphatic conjugated diene monomer, an ethylenically unsaturated carboxylic acid monomer and a monoolefinic monomer in a weight proportion of 24.5–50:0.5–5:45–75 in the presence of carbon tetrachloride and an alkylmercaptan.

As the aliphatic conjugated diene monomer, there may be used 1,3-butadiene, 2-methyl-1,3-butadiene, 2-chloro-1,3-butadiene, etc. Examples of the ethylenically unsaturated carboxylic acid monomer are acrylic acid, methacrylic acid, fumaric acid, maleic acid, itaconic acid, etc. As the monoolefinic monomer copolymerizable with the said monomeric components, there are exemplified alkenylaromatic compounds (e.g. styrene, α-methylstyrene, methyl-α-methylstyrene, vinyltoluene, divinylbenzene), alkyl esters of unsaturated carboxylic acids (e.g. methyl acrylate, methyl methacrylate, ethyl acrylate, ethyl methacrylate, butyl acrylate, glycidyl methacrylate, dimethyl fumarate, diethyl fumarate, dimethyl maleate, diethyl maleate, dimethyl itaconate, monomethyl fumarate, monoethyl fumarate, 2-ethylhexyl acrylate), hydroxyalkyl group-containing unsaturated compounds (e.g. β-hydroxyethyl acrylate, β-hydroxyethyl methacrylate, hydroxypropyl acrylate, hydroxypropyl methacrylate, hydroxybutyl acrylate, hydroxybutyl methacrylate, 3-chloro-2-hydroxypropyl methacrylate, di(ethyleneglycol) maleate, di(ethyleneglycol) itaconate, 2-hydroxyethyl maleate, bis(2-hydroxyethyl) maleate, 2-hydroxyethyl methyl fumarate), vinyl cyanide compounds (e.g. acrylonitrile, methacrylonitrile), etc. Among these monoolefinic monomers, the use of an alkenylaromatic compound with an alkyl ester of an unsaturated carboxylic acid or with an alkyl ester of an unsaturated carboxylic acid and a hydroxyalkyl group-containing unsaturated compound, particularly the use of styrene with methyl methacrylate or with methyl methacrylate and β-hydroxyethyl acrylate or methacrylate, is favorable for avoiding dirt in a reactor and/or affording a product having a high blister resistance.

The weight proportion of the aliphatic conjugated diene monomer, the ethylenically unsaturated carboxylic acid monomer and the monoolefinic monomer to be polymerized may be 24.5–50:0.5–5:45–75. When the amount of the aliphatic conjugated diene monomer is smaller than the said lower limit, the adhesive strength is lowered. When its amount is larger than the higher limit, the adhesiveness is too great, and the water resistance is decreased. In the case that the amount of ethylenically unsaturated carboxylic acid monomer is smaller than the lower limit, the adhesive strength and the mechanical stability of the polymer latex are lowered. In the case that its amount is larger than the higher limit, the viscosity of the polymer latex is too great. When the monoolefinic monomer is used in a smaller amount than the said lower limit, the water resistance is lowered. When it is employed in a larger amount than the said higher limit, the adhesive strength is decreased.

As the chain transfer agent, there is used carbon tetrachloride and an alkylmercaptan in combination. Examples of the alkylmercaptan are n-octylmercaptan, n-decylmercaptan, n-dodecylmercaptan, t-dodecylmercaptan, t-hexadecylmercaptan, n-tetradecylmercaptan, t-tetradecylmercaptan, etc. To 100 parts by weight of the total amount of the monomeric components, there are usually employed 0.5 to 10 parts by weight of carbon tetrachloride and 0.05 to 1 part by weight of the alkylmercaptan, preferably 2 to 7 parts by weight of carbon tetrachloride and 0.1 to 0.5 part by weight of the alkylmercaptan.

For the emulsion polymerization, there is usable a conventional emulsifier. The amount of the emulsifier may be from 0.05 to 2 parts by weight to 100 parts by weight of the total amount of the monomeric components. In addition, there may be used a polymerization initiator, an electrolyte, a polymerization promoter, a chelating agent or the like.

No limitation is present on the manner of introduction of the said components into the reaction system for the emulsion polymerization. Thus, the whole components may be added once to the reaction system. Alternatively, the components may be added in portions continuously or intermittently.

The emulsion polymerization may be carried out in a per se conventional procedure. The characteristic features of the emulsion polymerization according to this invention are as follows: (1) the dirt of the reactor is much prevented; (2) the production of the minute coagula is remarkably suppressed; (3) the amount of the chain transfer agent is relatively small, etc.

As stated above, the thus produced polymer latex contains only a very suppressed amount of coagula. Further, such coagula are minute (e.g. several to 50 microns) in particle size and can pass through even a net of 300 mesh. This is quite characteristic in comparison with coagula as produced in a conventional method, which are so large as more than 50 microns in particle size.

For preparation of a coating composition for paper, a mineral pigment (e.g. titanium dioxide, satin white, kaolin, calcium carbonate) is admixed with the polymer latex as a binder. If necessary, there may be incorporated into the coating composition any conventional additive such as a binding agent (e.g. starch, casein, polyvinyl alcohol), a crosslinking agent, an alkali stabilizer, an anti-foaming agent and/or a surfactant.

The thus prepared coating composition is advantageous in having a high mechanical stability. When applied on a paper, the resulting coated paper is excellent in water resistance, blister resistance and adhesive strength. No unfavorable smell is generated on drying by irradiation with ultraviolet rays.

Practical and presently preferred embodiments of the present invention are illustratively shown in the following Example wherein part(s) are by weight.

EXAMPLE (A) Preparation of a polymer latex:

In a pressure reactor, the monomeric components and a chain transfer agent were charged, and emulsion polymerization was carried out in a per se conventional manner to give a polymer latex.

(b) Preparation of a coating paper:

According to the following prescription, the polymer latex was admixed with other materials to give a coating color, which was applied on a sheet of paper to give a coated paper:

| Materials | Part(s) |
|---|---|
| Kaolin clay (No. 1 grade) | 70 |
| Calcium carbonate | 30 |
| Modified starch | 8 |
| Polymer latex | 10 |

(c) Properties of the polymer latex, the coating color and the coated paper:

The properties of the polymer latex, the coating color and the coated paper are shown in Table 1, wherein the dirt of the reactor was observed by naked eyes after the polymerization and evaluated according to the following criteria:

o: very little

Δ: moderate x: much

The minute coagula were observed by a microscope and evaluated according to the following criteria:

o: very little

Δ: moderate x: much

The gel content was determined by immersing about 1 gram (precisely weighed) of a specimen of a film of the polymer latex prepared by drying at room temperature in 400 ml of benzene, allowing the specimen in such state for 48 hours to dissolve it into the benzene, filtering the benzene solution through a filter paper (No. 2), evaporating the benzene from the benzene solution and weighing the residue, followed by calculation.

The mechanical stability was determined by kneading the coating color between a metal roll and a rubber roll by the use of a patastabilitester to apply a mechanical shearing force thereto and measuring the time (minute) required for the occurrence of a coagulum on the rubber roll. (A longer time indicates a better result.)

The RI wet pick was determined by judging macroscopically the extent of picking when printed using wet water by an RI printing machine and classifying the result into five stages from the first class (best results) to the fifth class (worst results) with an average of six judgements.

The RI dry pick was determined by the same procedure as in the RI wet pick but not using wet water.

The blister resistance was determined by adjusting the moisture contained in the coated paper to about 6%, admitting the same in an oil bath as heated and measuring the minimum temperature at which blister was produced.

The smell was judged by smelling the odor produced on irradiating ultraviolet rays to the coated paper.

TABLE 1

| Run No. | Monomeric components (parts) | | | Chain transfer agent (parts) | | Polymerization results | | | Coating color Mechanical stability (min) | Coated paper | | | Smell |
|---|---|---|---|---|---|---|---|---|---|---|---|---|---|
| | Aliphatic conjugated diene monomer[1] | Ethylenically unsaturated carboxylic acid monomer[2] | Monoolefinic monomer[3] | $CCl_4$ | t-Dodecyl mercaptan | Dirt of reactor[4] | Minute coagulum | Gel content (%) | | RI wet pick | RI dry pick | Blister resistance (°C.) | |
| 1 | BT (35) | IT (2) | ST (63) | 12 | 0 | x | △ | 60 | 20 | 1.4 | 3.0 | 220 | No |
| 2 | BT (35) | IT (2) | ST (63) | 8 | 0.4 | o | △ | 40 | 25 | 1.2 | 2.0 | 250 | No |
| 3 | BT (35) | IT (2) | ST (63) | 4 | 0 | x | △ | 80 | 20 | 4.5 | 1.5 | 180 | No |
| 4 | BT (35) | IT (2) | ST (63) | 4 | 0.2 | o | o | 60 | 30 | 1.1 | 1.2 | 220 | No |
| 5 | BT (35) | IT (2) | ST (63) | 4 | 0.4 | o | o | 50 | 30 | 1.1 | 1.5 | 240 | No |
| 6 | BT (35) | IT (2) | ST (63) | 0 | 0.2 | △ | x | 94 | 5 | 5.0 | 2.5 | 160 | No |
| 7 | BT (35) | IT (2) | ST (63) | 0 | 0.7 | △ | x | 60 | 1 | 3.0 | 2.5 | 220 | Yes |
| 8 | BT (35) | AA (2) | ST (53) MM (10) | 10 | 0 | x | △ | 63 | 20 | 1.8 | 2.0 | 230 | No |
| 9 | BT (35) | AA (2) | ST (53) MM (10) | 4 | 0 | x | △ | 78 | 20 | 4.0 | 1.5 | 195 | No |
| 10 | BT (35) | AA (2) | ST (53) MM (10) | 4 | 0.2 | o | o | 55 | 30 | 1.0 | 1.5 | 245 | No |
| 11 | BT (35) | AA (2) | ST (53) MM (10) | 0 | 0.6 | △ | x | 60 | 1 | 2.0 | 2.0 | 225 | Yes |
| 12 | BT (35) | AA (2) | ST (53) MM (10) | 0 | 0.9 | △ | x | 50 | 1 | 2.0 | 2.5 | 245 | Yes |
| 13 | BT (35) | MA (2) | ST (53) MM (8) HM (2) | 10 | 0 | x | o | 65 | 25 | 2.0 | 2.0 | 220 | No |
| 14 | BT (35) | MA (2) | ST (53) MM (8) HM (2) | 4 | 0.2 | o | o | 62 | 30 | 1.0 | 1.3 | 230 | No |
| 15 | BT (35) | MA (2) | ST (53) MM (8) HM (2) | 0 | 0.7 | △ | x | 65 | 3 | 2.5 | 2.5 | 215 | Yes |

Notes:
[1]BT, butadiene;
[2]IT, itaconic acid; AA, acrylic acid; MA, maleic acid;
[3]ST, styrene; MM, methyl methacrylate; HM, 2-hydroxyethyl methacrylate.
[4]Among Run Nos. 4, 10 and 14, the dirt of the reactor in Run No. 10 was lesser than that in Run No. 4; in Run No. 14, no material dirt was observed.

What is claimed is:

1. A coating composition for paper comprising a mineral pigment and a polymer latex prepared by emulsion polymerization of a monomeric mixture comprising 1,3-butadiene, an ethylenically unsaturated carboxylic acid monomer selected from the group consisting of acrylic acid, methacrylic acid, fumaric acid, maleic acid and itaconic acid, and at least one monoolefinic monomer selected from the group consisting of an alkenyl aromatic compound, an alkyl ester of an unsaturated carboxylic acid, a hydroxyalkyl group containing unsaturated compound and a vinyl cyanide compound in a weight proportion of 24.5-50:0.5-5:45-75 in the presence of a chain transfer agent, characterized in that the chain transfer agent is, in combination, carbon tetrachloride and an alkylmercaptan selected from the group consisting of n-octylmercaptan, n-decylmercaptan, n-dodecylmercaptan, t-dodecylmercaptan, t-hexadecylmercaptan, n-tetradecylmercaptan, and t-tetradecylmercaptan wherein the carbon tetrachloride and the alkylmercaptan are respectively used in amounts of from 0.5 to 10 parts by weight and of from 0.05 to 1 part by weight to 100 parts by weight of the monomer mixture.

2. The composition according to claim 1, wherein the carbon tetrachloride and the alkylmercaptan are respectively used in amounts of from 2 to 7 parts by weight and of from 0.1 to 0.5 part by weight to 100 parts by weight of the monomeric mixture.

3. The composition according to claim 1, wherein the monoolefinic monomer is an alkenylaromatic compound with an alkyl ester of an unsaturated carboxylic acid or with an alkyl ester of an unsaturated carboxylic acid and a hydroxyalkyl group-containing unsaturated compound.

4. The composition according to claim 3, wherein the monoolefinic monomer is styrene with methyl methacrylate or styrene with methyl methacrylate and β-hydroxyethyl acrylate or methacrylate.

5. A process for forming a polymer latex useful as a binder in a coating composition for paper, which comprises emulsion polymerizing a monomeric mixture comprising 1,3-butadiene, an ethylenically unsaturated carboxylic acid monomer selected from the group consisting of acrylic acid, methacrylic acid, fumaric acid, maleic acid and itaconic acid, and at least one monoolefinic monomer selected from the group consisting of an alkenyl aromatic compound, an alkyl ester of an unsaturated carboxylic acid, a hydroxyalkyl group containing unsaturated compound and a vinyl cyanide compound in a weight proportion of 24.5-50:0.5-5:45-75 in the presence of carbon tetrachloride and an alkylmercaptan selected from the group consisting of n-octylmercaptan, n-decylmercaptan, n-dodecylmercaptan, t-dodecylmercaptan, t-hexadecylmercaptan, n-tetradecylmercaptan and t-tetradecylmercaptan, as the chain transfer agent wherein the carbon tetrachloride and the alkylmercaptan are respectively used in amounts of from 0.5 to 10 parts by weight and of from 0.5 to 1 part by weight to 100 parts by weight of the monomer mixture.

6. A polymer latex prepared by the process according to claim 5.

* * * * *